United States Patent
Teufel et al.

(10) Patent No.: US 9,525,674 B2
(45) Date of Patent: Dec. 20, 2016

(54) METHOD FOR THE ENCRYPTION OF DATA

(71) Applicant: Appbyyou GmbH, Balgheim (DE)

(72) Inventors: Thomas Teufel, Balgheim (DE); Stefan Fledrich, Plochingen (DE)

(73) Assignee: Appbyyou GmbH, Balgheim (DE)

( * ) Notice: Subject to any disclaimer, the term of this patent is extended or adjusted under 35 U.S.C. 154(b) by 123 days.

(21) Appl. No.: 14/300,527

(22) Filed: Jun. 10, 2014

(65) Prior Publication Data

US 2014/0372760 A1    Dec. 18, 2014

(30) Foreign Application Priority Data

Jun. 12, 2013  (DE) .................. 10 2013 106 121

(51) Int. Cl.
| | |
|---|---|
| H04L 29/06 | (2006.01) |
| H04L 9/08 | (2006.01) |
| H04W 12/04 | (2009.01) |
| G09C 5/00 | (2006.01) |

(52) U.S. Cl.
CPC .......... *H04L 63/062* (2013.01); *H04L 9/0819* (2013.01); *H04L 9/0822* (2013.01); *H04L 63/0492* (2013.01); *H04L 63/061* (2013.01); *H04W 12/04* (2013.01); *G09C 5/00* (2013.01); *H04L 2209/80* (2013.01); *H04L 2209/805* (2013.01)

(58) Field of Classification Search
None
See application file for complete search history.

(56) References Cited

U.S. PATENT DOCUMENTS

| | | | | |
|---|---|---|---|---|
| 8,700,729 | B2* | 4/2014 | Dua ..................... | G06Q 20/20 705/64 |
| 2002/0170053 | A1* | 11/2002 | Peterka ................. | H04N 7/165 725/31 |
| 2003/0219129 | A1* | 11/2003 | Whelan ................ | H04L 9/0891 380/270 |
| 2004/0083393 | A1* | 4/2004 | Jordan ................. | H04L 63/068 726/6 |
| 2004/0249974 | A1* | 12/2004 | Alkhatib .......... | H04L 29/12349 709/245 |
| 2011/0119480 | A1* | 5/2011 | Massoudi ............ | H04N 7/1675 713/150 |
| 2012/0260108 | A1* | 10/2012 | Lee ..................... | G06F 21/6218 713/191 |
| 2013/0243187 | A1* | 9/2013 | Horstmeyer ............. | H04L 9/28 380/28 |
| 2014/0056171 | A1* | 2/2014 | Clegg .................. | H04W 12/06 370/254 |

\* cited by examiner

*Primary Examiner* — Amir Mehrmanesh
(74) *Attorney, Agent, or Firm* — Collard & Roe, P.C.

(57) ABSTRACT

To improve known encryption methods for communication in non-secured wireless networks, the invention proposes using an active key for encryption, in each instance, and sending along a new key in the messages, in each instance, which key, after it has been received completely, becomes the key used, and, once again, another new key is exchanged. This allows dynamic encryption, which allows an interception-proof connection, starting from a secure initial exchange of keys, for example.

12 Claims, 2 Drawing Sheets

METHOD FOR THE ENCRYPTION OF DATA

CROSS REFERENCE TO RELATED APPLICATIONS

Figure 1:
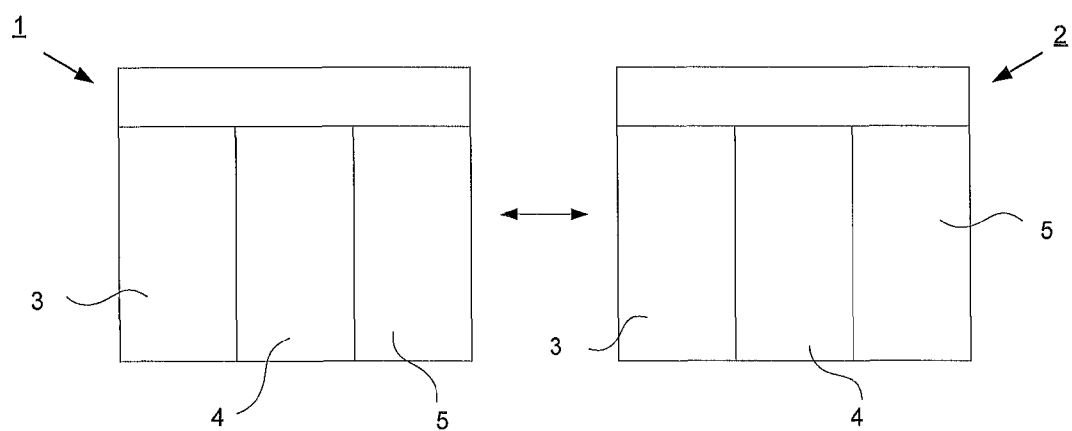

Applicant claims priority under 35 U.S.C. §119 of German Application No. 10 2013 106 121.4 filed on Jun. 12, 2013, the disclosure of which is incorporated by reference.

The present invention relates to a method for the encryption of data within the scope of a data transmission between two nodes of a communication network, in which a message to be sent between the two nodes is encrypted in the transmission node, using an active key, and transmitted to the reception node, and decrypted there using the active key.

Such methods have already been known for a long time and are used in all areas of communication in order to keep the content of data transmissions secret from third parties. Using the active key, a message that is comprehensible for the recipient in clear text is revised in such a manner that its meaning is no longer recognizable, but in the revision of the message, the method of procedure is such that the process can be carried out again, in the opposite direction, at the recipient's end, in order to arrive at the original text. Of course, such a method is not specified for working with text; fundamentally, an encryption method can be carried out with any type of ordered symbols. In particular, computer data are suitable for such encryptions, because ultimately, they can be traced back to various code tables, but at least to a binary code.

During the course of encryption, keys that are known on both sides of an established connection are kept on hand, so that both sides have the possibility of coding and reverse decoding. Furthermore, there is freedom in the selection of the coding methods, whereby simple coding could provide for adding numerical values to a text symbol or value symbol, while decoding in the reverse direction is implemented by means of subtraction. Such a calculation can be carried out without great calculation effort and thereby without any delay in reading out such a code, whereby the security of this encryption is decisively dependent on the active key used for the connection remaining unknown to a third party who wants to intercept the connection. In general, it turns out that in the event of a single successful interception of a message, the key is known and thereby a third party is enabled to decrypt all subsequent messages, and in the event that recording was successful previously, also earlier messages, after the fact.

Against this background, the invention is based on the task of creating a method that makes it difficult, according to the invention, to bring about decryption of a code.

This is accomplished by a method for the encryption of data within the scope of a data transmission between two nodes of a communication network as described herein. Other practical further developments of such a method can be derived from the additional features described herein.

According to the invention, it is provided that first, encryption takes place between two nodes of a communication network, using an active key. For this purpose, the two nodes will code their messages, using the active key, and will send them by way of the unsecured channel, whereby decoding takes place on the recipient side, using the active key, and thereby decryption of the message is made possible. Aside from the user data contained in the message, and the header required for the message, with general information concerning the structure of the message, message type, recipient, etc., the message according to the invention also contains an encryption data part in which data of a new key are sent to the recipient. Using the active key, new keys are therefore exchanged, which are then used as the new active key after full reception of the new key. After a key change, exchange of another new key with the communication partner starts immediately, in an encryption data part of the next message.

In this way, a constant change of the active keys used takes place, so that the likelihood is great that the amounts of data sent using an active key are not sufficient for decoding the active key. By means of the constant change in the key, it becomes difficult to follow the constant key changes, so that even in the unlikely event that decoding of the key takes place, a person intercepting messages falls behind again at the next incomplete reception of a message.

It is a weak point in this method if the first active key used were already made available in non-coded and non-encrypted form. For this reason, it appears necessary to exchange this first key in secure manner, as well, so that here, preferably a first key exchange between the two nodes communicating with one another is handled by way of near field communication.

Within the scope of such near field communication, the active key can be coded into a barcode in a first node, for example, and presented by way of suitable output means, which the second node then scans using input means. In this connection, the first node can be a mobile telephone, for example, which presents a representation of the barcode by way of its screen, which representation can then be scanned by the second input means in the form of a second smartphone participating in the communication, using a camera.

However, the near field communication can also easily take place in other ways, for example an ad hoc short-range wireless connection. In both cases, the short range and the possibility of ensuring interception security simply by means of presence monitoring is decisive for the security of the connection. Particularly when representing a barcode on a screen of a smartphone, it can easily be ensured that this barcode cannot be read in by a device other than the intended device.

During the course of communication, it is provided that encryption of the message to be encrypted, using the active key, takes place in that the character values of the message are set off against the character values of the active key. For example, an addition of the individual character values of the active key to the character values of the message can be carried out for this purpose. In the opposite direction, the recipient of the encrypted message will decrypt it again by means of setting the character values of the active key off against the character values of the encrypted message, in accordance with a reversal function of the function for encryption of the message that was established at first. In the example given, the addition could take place by means of subtraction of the character values of the active key from the character values of the encrypted message.

In general, the length of the key and the length of the message to be encrypted will be different. In the event that the key is longer than the message, character values of the key are set off against the character values of the message until the end of the key has been reached. If, on the other hand, the message is longer than the active key, then when the end of the key has been reached, repetition starts with the first place of the key, and the key is reiterated until the end of the message has been reached.

In order to further increase the variation of coding, the message can contain a non-encrypted character value that indicates an offset of the active key. Instead of starting with the first place of the key during coding, a jump to the offset takes place first, and coding using the key only starts at this place. As has already been indicated, it is necessary to transmit this offset in non-encrypted manner, so that the recipient has the information concerning at what place of the active key the recipient must begin with decoding.

In the event of a lost connection, it is necessary to undertake a new exchange of the active key, which ideally must be carried out in secured manner once again. In order to avoid excessive effort for this, it is advantageous if a fallback key is also exchanged at the first exchange, which key is then regularly used if a lost connection is found. A checksum is regularly appended to the user data part of the message, which allows checking that the message was transmitted correctly. If it is found, during the course of normal communication, that this checksum is not in order, the system will countercheck whether work was done with the fallback key here. In this case, the system will code with the fallback key, in turn, in its reply, and will continue the exchange of a new key that was already started.

With regard to the formation of the key, both the active key and the new key and the fallback key can consist of randomly selected character chains, in each instance. The length of the keys used can be selected dynamically, so that both short and long keys can be used, in order to make decoding more difficult, once again.

The invention described above will be explained in greater detail below, using an exemplary embodiment.

Figure 2:
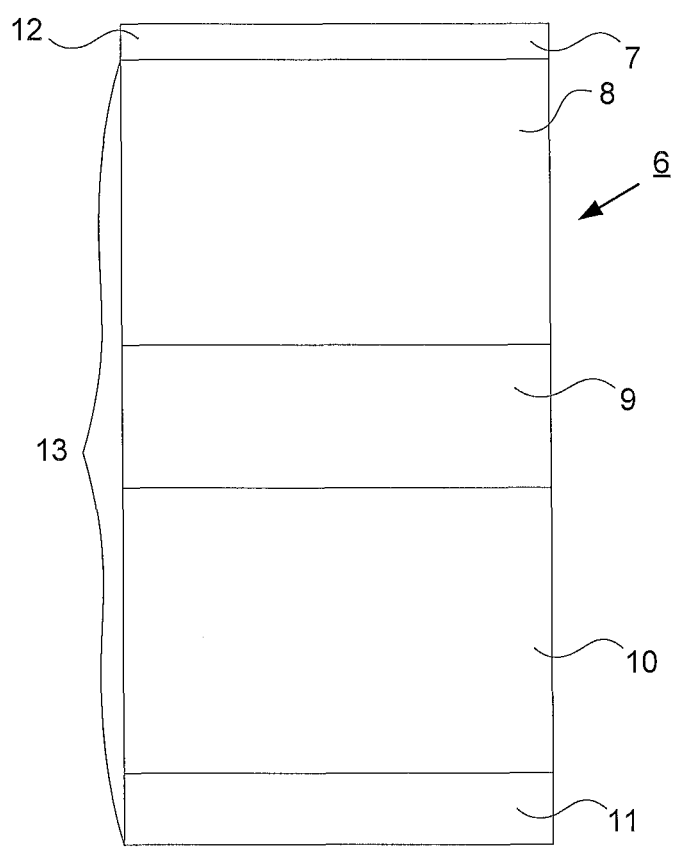

The figures show:

FIG. 1 a transmission node and a reception node, each having a memory in which an active key, a new key, and a fallback key are kept on hand, in a schematic representation, and FIG. 2 the structure of a message according to the invention, also in a schematic representation.

FIG. 1 shows a transmission node 1 as well as a reception node 2, which stand in reciprocal data connection. Within the scope of this connection, the transmission node 1 will transmit a message 6 to the reception node 2, which message is to be transported from the transmission node 1 to the reception node 2. For this purpose, the transmission node 1 will encrypt the message 6, for which purpose an active key 3 is used. For this purpose, the active key 3 is added to the message 6, bit by bit, whereby after the end of the active key 3 is reached, addition starts with its first place again. The message 6 furthermore contains an encryption data part 9 in which a new key 4 is transmitted to the reception node 2 by the transmission node 1. The encryption data part 9 can either contain a complete new key 4 or part of a new key 4. After complete transmission of the new key 4, the two nodes 1 and 2 will start to use the new key 4 as the active key 3 for further communication, and will exchange a new key 4 once again.

A fallback key 5 is also contained in the memory of the transmission node 1 and the reception node 2; this key is used if the connection was disrupted and orderly continuation of the connection is no longer possible.

A first exchange of the active key 3 and the fallback key 5 between the transmission node 1 and the reception node 2 is undertaken by way of near field communication, which prevents interception by a third party.

FIG. 2 shows the structure of the message 6 that is transmitted to the reception node 2 by the transmission node 1. The message 6 begins with an offset 7, followed by what is called a header 8, which contains meta-data concerning the structure and content of the subsequent message 6. This in turn is followed by an encryption data part 9 in which the new key 4 is transported to the reception node 2. In this connection, encryption data part 9 does not necessarily need to contain a complete new key 4, but can easily also contain part of a new key 4, which is then further completed in the next message 6. Following the encryption data part 9, the user data part is attached, in which the actual data of the message 6, which are to be transported, are transmitted. At the end of the message 6, a checksum 11 is disposed, which allows checking that the message 6 is complete. In the event that a checksum calculated by the system does not agree with the checksum 11 that was sent with the message, the message 6 must be rejected as being incorrect and, if necessary, the communication must be switched to encryption with the fallback key 5.

Within the message 6, only the first part, in other words the offset 7, can be viewed as a data part with non-encrypted data 12. The remainder of the message consists exclusively of data 13 encrypted using the active key 3 or the fallback key 5.

Therefore, a method for the encryption of data within the scope of a data transmission between two nodes of a communication network is described above, which method provides, within the scope of a communication, for permanently exchanging new keys between the transmission nodes and the reception nodes, which keys replace the key that was previously in effect, after a complete transmission.

REFERENCE SYMBOL LIST 1 transmission node
2 reception node
3 active key
4 new key
5 fallback key
6 message
7 offset
8 header
9 encryption data part
10 user data part
11 checksum
12 non-encrypted data
13 encrypted data

The invention claimed is:
1. A method comprising the steps of:
encrypting a message in a transmission node of a communication network, using an active key, the message comprising a header, a user data part, and an encryption data part, the encryption data part comprising data of a new key,
sending the message from the transmission node to a reception node of the communication network,
decrypting the message at the transmission node, using the active key,
after the sending of the message from the transmission node and after reception of the new key at the reception node, replacing at both the transmission node and at the reception node the active key with the new key for further communication,
exchanging a fallback key between the transmission node and the reception node, and
regularly using the fallback key as a fallback in the event that the connection is lost,
wherein the sending of the message between the transmission node and the reception node takes place by way of near field communication,
wherein for the sending of the message, the transmission node codes the active key as a barcode and represents the barcode by way of an output device, and the reception node scans the barcode by way of an input device, and wherein the active key, the new key, and the fallback key are different keys.

2. The method according to claim 1, wherein the encryption of the message, using the active key, takes place via setting the character values of the active key off against the character values of the non-encrypted message, in accordance with a predetermined function, and wherein the decryption of the message takes place via setting the character values of the active key off against the character values of the encrypted message, in accordance with a reversal function of the predetermined function.

3. The method according to claim 2, wherein in the event that the message is longer than the active key, the character values of the active key are iterated.

4. The method according to claim 2, wherein the message contains a character value that is not encrypted and that indicates an offset of the active key at which the encryption is started.

5. The method according to claim 1, wherein the active key and the new key comprise randomly selected chains of characters.

6. The method according to claim 1, wherein the active key and the new key are formed in different lengths.

7. A method comprising the steps of:
encrypting a message in a transmission node of a communication network, using an active key, the message comprising a header, a user data part, and an encryption data part, the encryption data part comprising data of a new key, sending the message from the transmission node to a reception node of the communication network, decrypting the message at the transmission node, using the active key, after the sending of the message from the transmission node and after reception of the new key at the reception node, replacing at both the transmission node and at the reception node the active key with the new key for further communication, exchanging a fallback key between the transmission node and the reception node, and regularly using the fallback key as a fallback in the event that the connection is lost, wherein the encryption of the message, using the active key, takes place via setting the character values of the active key off against the character values of the non-encrypted message, in accordance with a predetermined function, wherein the decryption of the message takes place via setting the character values of the active key off against the character values of the encrypted message, in accordance with a reversal function of the predetermined function, and wherein the active key, the new key, and the fallback key are different keys.

8. The method according to claim 7, wherein the sending of the message between the transmission node and the reception node takes place by way of near field communication, and wherein the near field communication takes place by way of an ad hoc wireless connection with a short range.

9. The method according to claim 7, wherein in the event that the message is longer than the active key, the character values of the active key are iterated.

10. The method according to claim 7, wherein the message contains a character value that is not encrypted and that indicates an offset of the active key at which the encryption is started.

11. The method according to claim 7, wherein the active key and the new key comprise randomly selected chains of characters.

12. The method according to claim 7, wherein the active key and the new key are formed in different lengths.

\* \* \* \* \*